Oct. 12, 1926. 1,602,402
O. S. FLATH
BATTERY
Filed Feb. 16, 1922 2 Sheets-Sheet 1
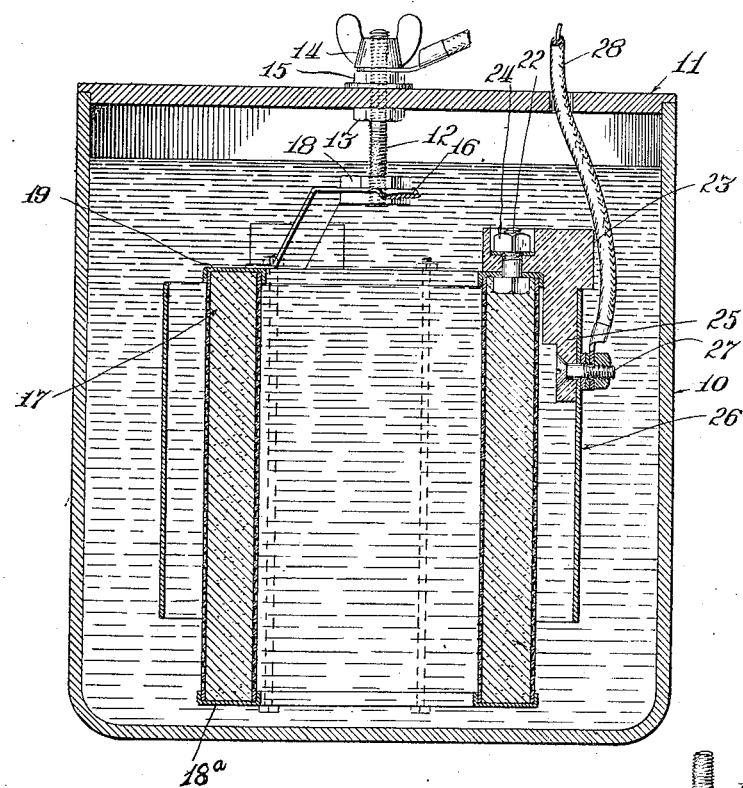
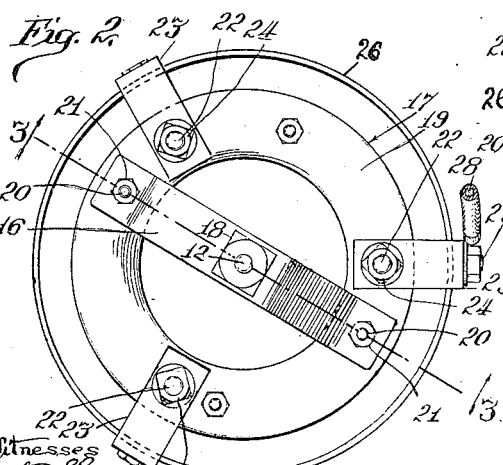
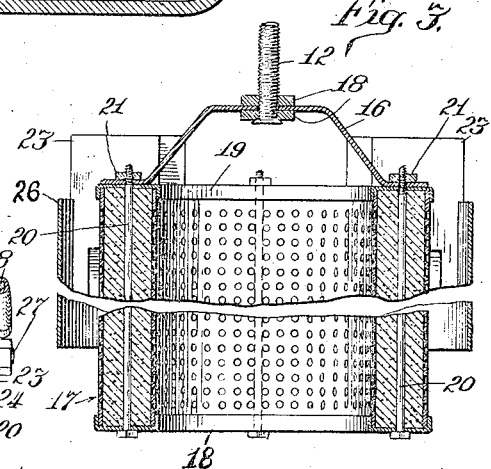

Oct. 12, 1926.

O. S. FLATH 1,602,402

BATTERY

Filed Feb. 16, 1922

Inventor
Otto S. Flath,
by George Heidman
Attorney

Witnesses

Patented Oct. 12, 1926.

1,602,402

UNITED STATES PATENT OFFICE.

OTTO S. FLATH, OF CHICAGO, ILLINOIS.

BATTERY.

Application filed February 16, 1922. Serial No. 536,842.

My invention relates to improvements in primary batteries employing cylindrical or tubular forms of positive and negative elements; the invention relating more particularly to means whereby the positive and negative elements may be insulatedly secured together in proper spaced relation to constitute a unit adapted to be supported or suspended by a single element from the cover of the jar or vessel which contains the electrolyte or caustic soda and oil solution. The object of my invention is the provision of a unit which can be readily removed or replaced so that the battery may be easily refilled when renewal is necessary, without the necessity of replacement of the container or jar; the electrode unit being properly arranged and related so that the user may readily replace the dissipated electrodes with a new unit by merely suspending said unit from the cover of the container in which a new electrolyte or solution has been placed, with the result that the renewal cost will be materially reduced.

As the negative element contemplates the use of granular copper oxide in a perforated tubular container or cylinder, in order that the element may be readily transported without loss, I prefer to provide either the granular oxide or the container with a suitable coating or chemical,—as for example paraffine,—which will prevent the sifting out of the oxide, but which at the same time will become dissociated from the granulars or container by the action of the electrolyte and be caused to float thereon, without, however, in any way affecting the efficiency of the battery.

The objects of my invention, as well as the advantages thereof, will be more fully comprehended from the detailed description of the accompanying drawings wherein:—

Figure 1 is a vertical central sectional view.

Figure 2 is a top plan view of the electrode unit removed from the electrolyte containing jar or vessel.

Figure 3 is a vertical sectional view taken substantially on the line 3—3 of Figure 2 looking in the direction of the arrows, with intermediate portions of the unit broken away.

Figure 4:
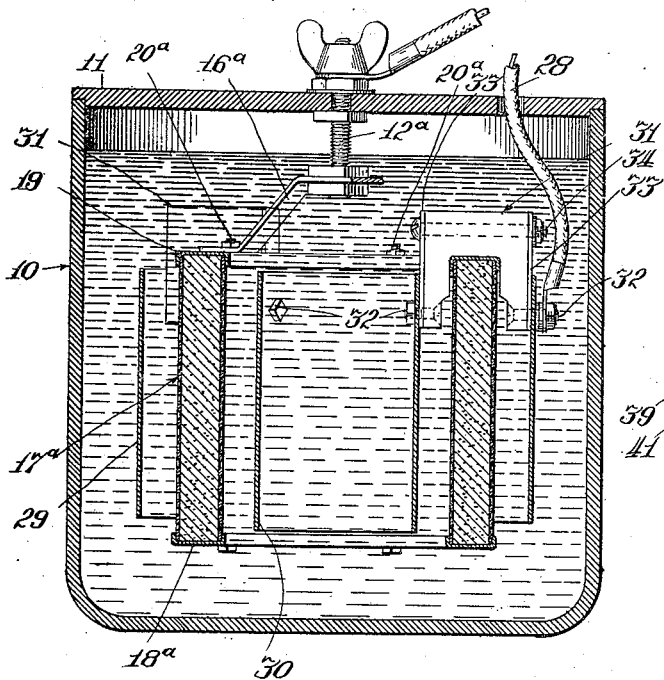
Figure 4 is a vertical sectional view of a modified form of my invention.
Figure 5:
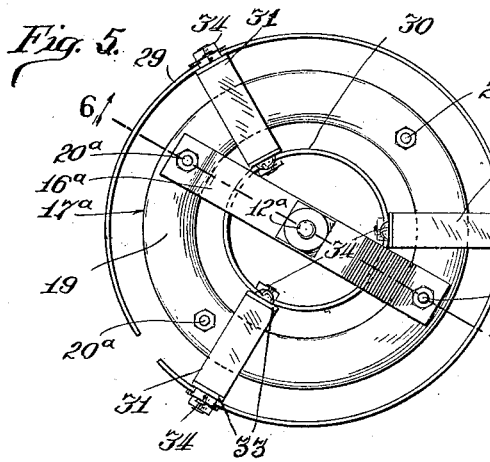

Figure 5 is a top plan view of the modified form of electrode unit shown in Figure 4.

Figure 6:
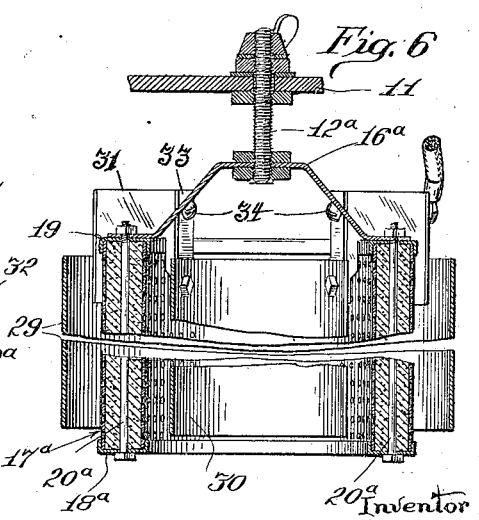

Figure 6 is a vertical sectional view taken on the line 6—6 of Figure 5 looking in the direction of the arrows, with the intermediate portion of the unit broken away.

Figure 7:
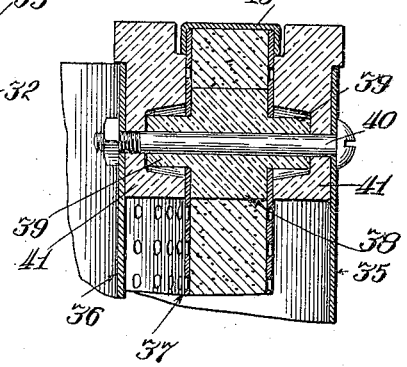

Figure 7 is a detail sectional view of a modification.

In the particular exemplification of the invention as disclosed in Figure 1, 10 indicates a suitable vessel or jar for containing the caustic solution or electrolyte and provided with a suitable cover or lid 11 which is provided with a pair of apertures; the opening substantially at the center being adapted to receive the threaded end of a post or rod 12. The post or rod 12 is provided with a nut 13 adapted to fit against the lower side of the cover or lid 11, and preferably with the thumb-nut 14 on the outer side of the cover or lid and which in turn is shown locked against accidental rotation by a nut 15. The post or rod 12 at its lower end is provided with a suitable head and extends through a metallic strap or bracket 16 which is adapted to straddle the opening through the cylindrical element, which, in the exemplification in Figure 1, constitutes the negative element 17. In order that proper binding and supporting relation may be had between the rod 12 and the strap or bracket 16, I have shown the rod 12 provided with washers or nuts 18 disposed on the upper and lower side of the strap or bracket 16. The negative element 17 consists of a pair of concentrically arranged perforated tubular metallic shells or casings, provided with a bottom 18$^a$ and a suitable top cap 19 which are held in place at the top and bottom ends of the concentric tubular walls by means of a suitable number of rods 20. The lower ends of these rods are preferably provided with enlargements or heads, while the upper ends protruding through the top cap 19 are threaded to receive nuts 21, whereby the top and bottom rings or members 18$^a$ and 19 are firmly clamped onto the ends of the tubular walls, thereby closing the annular chamber intermediate of the concentric tubular members; the chamber being filled with an oxide constituting the negative element or electrode. The top and bottom caps or members in Figure 1 are shown preferably consisting of the annular members or rings having flanged perimeters adapted to extend flush with the outer sides of the tubular walls and as the top and bottom caps or members are held in place by the rods and nuts previously described, it is apparent that access to the oxide holding chamber or portion may be readily had when occasion requires.

In the construction shown in Figures 1 to 3, the strap or bracket 16 is provided with ends adapted to extend flush with the top cap or ring 19 and these ends are apertured to receive the upper ends of two of the rods 20, thus permitting the bracket to be secured in place without employing additional rods or bolts, while at the same time providing a strong support for the entire unit.

At suitable intervals, the top ring or cap 19 is provided with openings for the passage of the short bolts as at 22 whereby suitable spacing members or insulators 23 are secured in place. The insulator blocks 23, of which any suitable number may be employed, are preferably provided with a counter-bored aperture therethrough for the passage of the bolts 22 and to receive the nut 24; the head of the bolt being preferably disposed on the inner side of the top cap 19. By countersinking the nuts 24, as shown, accidental loosening thereof, will be prevented. The insulator blocks 23, of porcelain or other suitable insulating material, are each provided with a depending portion or leg 25, cut away or reduced on both sides so as to provide a shoulder or abutment for the positive cylinder or zinc shell 26 on the outer side of the blocks, and thus prevent upward displacement thereof; while the inner side of the leg 25 of the insulating block 23 at a lower point is sufficiently cut away or reduced to provide sufficient space for the attaching member or screw 27 whereby the zinc shell is secured to the insulator blocks, while at the same time removing the inner end of the metallic member or screw 27 a sufficient distance from the negative element. As shown in Figure 1, one of the attaching elements or screws 27 also constitutes the binding post for the field wire or lead line 28 leading from the positive electrode.

The top cap and bottom member 19 and 18$^a$ are substantially of similar construction consisting of annular members or rings having the angularly disposed flanges at the inner and outer perimeters and are intended, in what is known as the refillable unit, enabling the container to be recharged with the oxide, to be held in place merely by the rods or long bolts 20; the short bolts 22, for holding the insulating blocks or members 23 in place, being inserted in place before the top cap 19 is clamped into position by the retaining bolts 20.

In Figures 4 to 6, I show the duplex or multiple type of battery, namely the type wherein a number of positive electrodes or zinc cylinders are employed and arranged in proper spaced relation concentrical with the negative electrode, to wit—the cylindrical container for receiving the oxide or negative element. This construction, like that disclosed in Figure 1, contemplates a suitable bracket 16$^a$, substantially similar to the bracket 16 in Figure 1, apertured at its intermediate point to receive the suspension post or rod 12$^a$ provided with a suitable nut for retaining it in place and to clamp one of the field wires or lead lines of the electrical circuit.

The negative element holding member or container 17$^a$, like the one shown in Figure 1, comprises the concentric perforated walls between which the copper oxide is placed; with the ends of the walls or shells being provided with the cap members 18$^a$ and 19 also preferably formed as previously described; that is to say, the cap members are removably held in place by means of a suitable number of rods or bolts 20$^a$ disposed from top to bottom and held in place by suitable nuts. Where the negative container is to be of what may be the permanent type, the top and bottom caps may be permanently secured to the side walls of the container by crimping or beading as is usual with sheet metal containers or cans.

In the construction shown in Figure 4, the negative element is suspended from the cover or lid 11 of the jar 10, by having two of the bolts or rods 20$^a$ extend through the ends of the bracket 16$^a$; while the positive elements, which consist of the cylindrical or tubular zinc plates 29 and 30 are arranged concentrically with the negative container, in spaced relation therewith; namely with the zinc cylinder or tube 29 disposed about the negative container while the tubular zinc plate 30 is arranged within the negative container, thereby providing considerable area or surface for the electrolytic action. The positive elements or tubular zinc plates 29 and 30 are both intended to be suspended from or supported by the negative container in order that the entire unit may be suspended by a single bracket and post from the cover or lid of the jar; the manner of supporting or suspending the positive elements, however, being such that they will be maintained in suitable spaced relation with the negative element, while at the same time permitting their ready removal and replacement. The means for supporting the positive elements in place consist of a suitable number of insulated members or blocks as at 31 provided with an undercut portion or groove of width sufficient to receive the upper end of the negative element or container, so that the insulated members or blocks 21 are adapted in reality to bridge the negative container and provide depending legs or portions on the inner and outer surfaces of the negative container. The lower ends of both depending legs or portions of the insulating means 31 are apertured to receive the small screws or bolts 32, 32 whereby the positive elements 29 and 30 are secured to each insulator member or block 31; one of the sustaining screws or bolts 32 being also intended to provide attachment for the lead line or field wire 28.

In order that the two positive elements or zinc cylinders may act as a unit, the short bolts or screws 32 are also adapted to maintain the metallic straps or extension 33, 33 in place and in firm contact with the upper ends of the zinc or tubular plates 29 and 30, while the upper ends of these straps or extensions 33 are arranged in electircal contact or connection with each other by means of a bolt 34 disposed through both straps or extensions 33 and an aperture in the insulating member or block 31.

The constructions shown and described prevent any possibility of short circuits; and the employment of a cylindrical sheet of zinc disposed within the negative electrode, open at both ends thereof, offers a greater area than has heretofore been the case, for the action set up in the battery; and this construction provides a battery of higher efficiency than has heretofore been obtained. It will be understood that a sufficient number of insulating members or blocks 31 are employed to properly maintain the respective electrodes in proper spaced relation, against any accidental shifting or movement.

In Figure 7 I illustrate a modified form of insulating and supporting means for the electrodes, having chosen to illustrate the same applied to a duplex type, namely a type provided with two positive elements 35 and 36 arranged, respectively, to the exterior of and within the negative container 37, which latter may be provided with the removable end members or caps previously described. In this construction, the interior of the negative container 37 is provided with an insulating element or block 38 having laterally disposed lobes or lugs as at 39, 39 adapted to extend through suitable openings in the sides of the container; the insulating block 38 being provided with an opening therethrough and through said lobes or extensions 39, for the passage of a bolt 40 whereby the two insulator members or blocks 41, 41, as well as the positive elements 35 and 36, are secured in place. The blocks or members 41, 41 are each provided with a socket at a point intermediate of the upper and lower ends, which is adapted to receive the respective extension or lobe 39 of the insulator element 38, and at the same time have bearing against the adjacent walls of the negative container 37, while the opposite side of each block 41 is shouldered adjacent the upper end, to provide abutment for the respective positive element or zinc cylinder. The insulator blocks 41 are each slightly cut away at the upper inside to receive the top-cap or closure for the upper end of the negative container; and the construction not only properly spaces and supports the electrodes, but it prevents any possibility of short circuiting; the positive elements being held in place by the bolt or member 40 which also constitutes a conducting member for electrically connecting the two positive elements as a unit.

As is clearly apparent from the construction shown in Figure 7, the blocks 38 with the negative container, not only constitute an insulator between the conducting and fastening member 40, but also act as spacing blocks for the two walls of the container to maintain the walls against collapsing or compression, as the main portions of the blocks extend about the openings in the side walls of the container and take the compression strain exerted by the outer insulating members 41 when the nut on bolt 40 is screwed firmly into place.

In all of the construction shown, the positive elements are preferably of tubular form, namely shells of zinc either bent or molded into the open-ended forms disclosed so as to offer a greater surface or area to the action of the electrolyte.

While the construction has been described and shown as applied to a duplex type of battery, it is apparent that this construction is equally adapted for use in connection with the single type of battery unit, in which case one of the blocks 41 may be omitted. The construction shown in Figure 7, like the previously described constructions, is also intended to be suspended by a single suspension bolt or member in conjunction with a bracket whose ends are secured to the upper end of the negative container.

In order that the negative element may be properly held or sealed within the perforated containers, during shipment or transporting from place to place, while not in the jar, the negative containers, or the granular copper oxide may be provided with a coating (through immersion or otherwise) of a suitable solution or element—for example a coating of paraffine—whereby the granular oxide will be prevented from sifting out of the container; said coating, however, being of such substance or nature that it will separate itself or become dissociated from the container or the oxide through the action of caustic soda or the electrolyte and thus release the oxide. By providing either the perforated negative container or the granular oxide with a coating as just stated, loss of the material will be prevented while the battery units are in a dry state and are being moved about.

The electrodes are not only suspended and supported by a single member from the cap of the battery jar, but they are positively held in proper spaced relation against any short circuiting and in a manner which will permit the ready removal or replacement of the electrodes or elements as occasion requires; while at the same time in the duplex type of unit, the two zinc cylinders or positive elements, while independent of each other physically speaking, are so suspended as to act as one unit while at the same time preventing any possibility of short circuiting.

I have shown and described my invention in forms which I believe to be the simplest embodiments and have described the same in terms employed merely as terms of description and not as terms of limitation, as structural modifications are possible and may be made without, however, departing from the spirit of my invention.

What I claim is:—

1. A battery comprising a jar provided with a cover, a perforated double walled tubular container, removable closures at top and bottom of said container, rods disposed between the walls of the container and through the top and bottom closures for removably holding the latter in place, a suspension bracket secured to the upper ends of certain of said rods and provided with a binding post disposed through said cover and removably secured thereto whereby the tubular container is suspended from said cover, a tubular electrode arranged concentrically with the container in spaced relation therewith, and insulating blocks kerfed to fit over the upper end of said container and disposed intermediate of the container and the tubular electrode, the tubular electrode being removably secured at its upper end to the side of the insulating blocks whereby the tubular electrode is carried by and suspended from the container.

2. In a battery of the character described, a jar provided with a cover, a perforated double walled tubular container for the negative element, provided with top and bottom closure members so as to provide a central opening through the container, means disposed between the walls of the container and removably secured to the top and bottom closure members for holding the same in place, a bracket member secured to a portion of said means and provided with a binding post adapted to extend through and be removably secured to said cover, a pair of tubular sheet metal elements arranged concentrically with the container, with the container disposed between said elements, a plurality of insulating blocks adapted to extend transversely of the upper end of the container and disposed on opposite sides thereof with the upper ends of the tubular elements removably secured to opposite sides of the blocks and the container and tubular elements maintained in spaced relation, and means disposed through the insulating blocks whereby the two tubular sheet metal elements are electrically connected.

3. A battery of the character described, comprising a jar or vessel provided with a cover, a tubular container consisting of concentrically arranged and spaced perforated cylindrical shells, top and bottom closures for the container, rods extending between the shells from top to bottom whereby said closures are removably secured in place, apertured insulating blocks disposed transversely of the container and provided with reduced portions extending through the shells of the container to maintain the latter in spaced relation, a suspension member removably secured to the upper ends of certain of said rods and adapted to be removably secured to the cover of the jar, tubular electrodes arranged concentrically with the container, insulating members secured adjacent to the top of the container to the reduced portions of the first mentioned insulating blocks, and means disposed through said apertured blocks and the insulating members whereby the electrodes are electrically connected together and the insulating members and electrodes supported in spaced relation from the upper end of the container.

OTTO S. FLATH.